(12) United States Patent
Berg et al.

(10) Patent No.: US 7,841,442 B2
(45) Date of Patent: Nov. 30, 2010

(54) HYDROSTATIC TRANSMISSION

(75) Inventors: Torsten Berg, Steina (DE); Jürgen Legner, Friedrichshafen (DE); Jörg Geis, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1189 days.

(21) Appl. No.: 10/543,725

(22) PCT Filed: Jan. 22, 2004

(86) PCT No.: PCT/EP2004/000492

§ 371 (c)(1),
(2), (4) Date: Dec. 20, 2005

(87) PCT Pub. No.: WO2004/068005

PCT Pub. Date: Aug. 12, 2004

(65) Prior Publication Data

US 2006/0230920 A1    Oct. 19, 2006

(30) Foreign Application Priority Data

Jan. 28, 2003   (DE) ................................ 103 03 206

(51) Int. Cl.
*B60K 17/00* (2006.01)
(52) U.S. Cl. ...................... 180/305; 180/170
(58) Field of Classification Search ......... 180/305–307, 180/53.4, 170, 171, 175, 176, 177; 701/93, 701/95
See application file for complete search history.

(56) References Cited

U.S. PATENT DOCUMENTS

| 5,079,704 | A | * | 1/1992 | Sakai et al. .................... 701/57 |
| 5,435,131 | A | | 7/1995 | Hausman et al. |
| 5,575,735 | A | * | 11/1996 | Coutant et al. ................. 475/72 |
| 5,628,187 | A | | 5/1997 | Göllner |
| 5,678,462 | A | * | 10/1997 | Bausenhart et al. ........ 74/731.1 |
| 6,138,069 | A | | 10/2000 | Ellertson et al. |
| 6,260,440 | B1 | | 7/2001 | Cronin et al. |
| 7,219,967 | B2 | * | 5/2007 | Magnien et al. ............. 303/152 |
| 2004/0060206 | A1 | | 4/2004 | Ichimura |

FOREIGN PATENT DOCUMENTS

| DE | 42 34 826 C1 | 10/1993 |
| DE | 43 12 716 A1 | 10/1994 |
| DE | 195 13 806 A1 | 10/1995 |
| DE | 195 05 691 A1 | 8/1996 |
| DE | 195 24 669 A1 | 1/1997 |
| EP | 0 530 842 A2 | 3/1993 |
| JP | 4258570 | 9/1992 |
| JP | 6183282 | 7/1994 |
| JP | 11351384 | 12/1999 |
| WO | WO/02/48581 A1 | 6/2002 |
| WO | WO/02 057662 A1 | 7/2002 |

* cited by examiner

*Primary Examiner*—Paul N Dickson
*Assistant Examiner*—Bridget Avery
(74) *Attorney, Agent, or Firm*—Davis & Bujold, P.L.L.C.

(57) ABSTRACT

A hydrostatic transmission that is operated in an open loop by way of an adjustable hydraulic motor (5), which is adjusted for the purpose of acceleration or deceleration with the aid of an electronic control unit (8) such that a desired vehicle speed corresponds to a measured vehicle speed.

8 Claims, 2 Drawing Sheets

HYDROSTATIC TRANSMISSION

This application is a national stage completion of PCT/EP2004/000492 filed Jan. 22, 2004 which claims priority from German Application Ser. No. 103 03 206.1 filed Jan. 28, 2003.

FIELD OF THE INVENTION

The invention relates to a hydrostatic transmission.

BACKGROUND OF THE INVENTION

The invention relates to a hydrostatic transmission according to the kind described in more detail in the preamble of claim 1.

Hydrostatic transmissions of this type are used, for example, in construction machinery, such as excavators, for driving a mobile vehicle. A hydraulic pump is operated with a hydraulic motor in an open loop, where the hydraulic pump removes hydraulic fluid from a hydraulic fluid medium and supplies it to the hydraulic motor via a working line. Frequently a shiftable transmission is arranged downstream from the hydraulic motor. The hydraulic fluid flow leaving the hydraulic motor can be limited, using pressure control valves, so as to prevent impermissible acceleration of the vehicle when traveling downhill. The brake valve limits the hydraulic fluid flow of the hydraulic motor such that hydraulic pressure builds up on the returning working line, which together with the set intake volume of the hydraulic motor creates a brake torque. This brake torque changes with the change in intake volume of the hydraulic motor and acts upon the drive wheels as a function of the reduction of the gear arranged downstream and hence the engaged gear. Dangerous driving situations may arise if the intake volume of the hydraulic motor has been set to the minimum level and the slope descending force, which acts upon the vehicle due to grade of the hill, exceeds the possible brake torque generated by the hydraulic motor with the aid of the brake valves.

EP 0 530 842 B1 discloses a reversible hydrostatic transmission with a brake valve in which the displacement volume of the hydraulic motor is adjusted as a function of the hydraulic pressure generated by the brake valve. This way, the hydraulic motor is switched to its maximum displacement volume, generating a maximum brake torque of the hydraulic motor during travel on a steep downward slope. Since the adjustment of the hydraulic motor occurs exclusively as a function of the back pressure created by the brake valve, it is not possible to influence the deceleration created by this brake torque. Depending on the set reduction of the reducing gear arranged downstream, this deceleration also creates varying effects on the vehicle.

It is the object of the present invention to create a hydrostatic transmission, which will not lead to impermissible driving situations even in a trailing throttle mode.

The object is achieved with a generic hydrostatic transmission.

SUMMARY OF THE INVENTION

The hydraulic motor is activated by an electronic control unit, according to the invention, such that its intake or displacement volume is adjusted in such a way that a desired speed of the vehicle is achieved. For this, the desired speed is fed to the electronic control unit, being determined, for example, from the accelerator pedal position or the position of the main control valve or with the help of a pressure sensor in the control pressure of the accelerator pedal to the main control valve or a rotary angle transducer on the accelerator pedal. Moreover, the electronic control unit receives a signal that corresponds to the vehicle speed which, for example, can be derived from an output rotational speed of the transmission or the rotational speed of the hydraulic motor in combination with the gear reduction of the transmission. The minimum intake volume of the motor is not limited mechanically. If the measured vehicle speed deviates from the desired vehicle speed, the intake volume of the hydraulic motor is adjusted such that the desired vehicle speed corresponds to the actual vehicle speed. For this a hydraulic motor, which can be adjusted as a function of the control pressure or one that can be adjusted electrically proportionally with superimposed pressure control, is used. A brake valve is installed on the motor and, between the motor and the brake valve, secondarily acting pressure control valves are arranged. During acceleration, i.e., a traction mode, the control signal of the electronic control unit to the hydraulic motor is adjusted corresponding to the current diesel engine rotational speed and the accelerator pedal position, i.e., to the volume current, such that the correspondingly possible speed can be achieved this way, i.e., the signal is a leading signal.

The hydraulic motor adjusts its intake volume in accordance with the control pressure resulting from the given amount of hydraulic fluid and the available driving performance. When the present speed approaches the target speed, the control signal to the hydraulic motor is accordingly adjusted as a function of the current vehicle acceleration and/or the deduced difference between target and actual speeds (characteristic diagram) so that the deviation between the target and the actual speeds is as little as possible. The same characteristic diagram is also used if the current speed is greater than the target speed.

If the vehicle has an actual speed greater than the target speed, which arises, for example, due to downward slope travel or the change of the accelerator pedal to a lower speed, the electronic control unit activates the hydraulic motor such that it is adjusted to a greater intake volume thus reducing the speed. If this decreases the supply pressure to the hydraulic motor to below a defined value, the brake valve starts to close thus building hydraulic pressure on the hydraulic motor on the output side which, in conjunction with the set intake volume of the hydraulic motor, creates a brake pressure and hence a brake torque. During the brake operation, the level of the intake volume adjustment allows the level of deceleration to be influenced. The intake volume adjustment is controlled electronically during the braking operation as a function of the deviation between the target value of the deceleration, which the electronic control unit derives from a stored characteristic diagram, and the actual deceleration value. It is possible to select several limits, for example, "rough", "medium" and "soft" for the target value deceleration. The electronic control unit determines the actual deceleration from the change in the output rotational speed. This way, regardless of the reduction of the reducing gear arranged downstream, the same deceleration is always adjusted. It is feasible to design the electronic control unit such that the "rough" deceleration is adjusted automatically when the driver actuates the service brake at the same time. This way the service brakes experience less strain.

In another embodiment, a temperature sensor is located in the hydraulic tank, the signal of which is used in case of excess temperatures to lower the permissible travel speed. In another embodiment, it is feasible to limit the maximum speed during the warm-up period in winter operation until the operating temperature has been reached.

In another embodiment, it is possible to limit the speed as a function of oil quality.

In a further embodiment, it is possible to maintain the intake volume of the hydraulic motor within its maximum intake volume as long as the vehicle is in the creep speed position.

The transition from the normal travel state to the creep speed is performed in accordance with a pre-selected deceleration.

By using a hydraulic motor that can be adjusted as a function of the control pressure or one that is proportionally adjusted electrically with superimposed pressure control for the hydrostatic transmission, during a traction mode in which the high pressure set on the pressure control is exceeded, it is possible to adjust the hydraulic motor automatically to a larger intake volume. This way it is guaranteed that the vehicle can provide the required tractive force.

The hydrostatic transmission, according to the invention, offers the possibility of achieving the specified vehicle deceleration or acceleration, regardless of the temperature of the hydraulic fluid, the amount of hydraulic fluid and the reducing gears arranged downstream. Likewise, it is ensured that no critical driving conditions may occur even when driving down a slope.

BRIEF DESCRIPTION OF THE DRAWINGS

The invention will now be described, by way of example, with reference to the accompanying drawing in which.

DETAILED DESCRIPTION OF THE INVENTION

Figure 1:
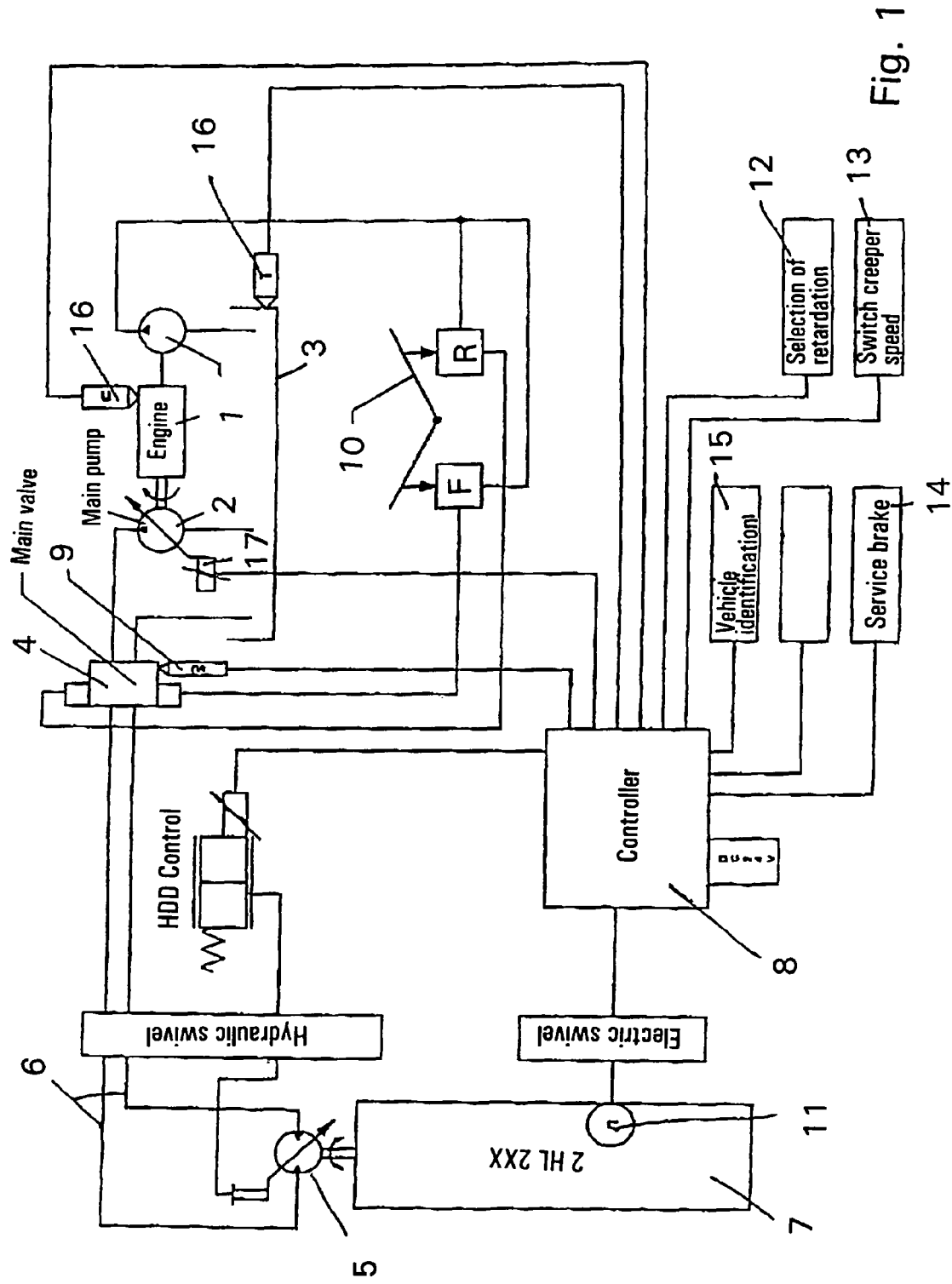
FIG. 1 shows a block diagram of the hydrostatic transmission.

FIG. 1:

Engine 1 drives a hydraulic pump 2 which removes hydraulic fluid from a hydraulic fluid reservoir 3. The hydraulic pump 2 is connected to a hydraulic motor 5 via a main control valve 4. The hydraulic motor 5 is connected, via two working lines 6, to the main control valve 4 which depending on the excursion, connects a working line to the hydraulic pump 2 and a working line to the hydraulic pressure reservoir 3. The hydraulic motor 5 is a hydraulic motor that can be adjusted as a function of the control pressure with a superimposed pressure control, which comprises a brake valve (not illustrated) and secondarily acting pressure control valves (also not shown). A shiftable reducing gear 7, which is connected to the vehicle wheels, is arranged downstream from the hydraulic motor 5. By way of a sensor 9, an electronic control unit 8 receives information about the excursion of the main control valve 4, which is directly connected to an accelerator pedal 10. By way of a rotational speed sensor 11, the electronic control unit 8 receives the output rotational speed signal which corresponds to a driving speed of the vehicle. Additionally, the electronic control unit 8 is connected to a deceleration selector 12, which allows the selection of three deceleration stages "soft", "medium", "rough", and to a creep speed switch 13, upon the activation of which the electronic control unit 8 adjusts the intake volume of the hydraulic motor 5 to its maximum intake volume, a brake switch 14, upon the activation of which the electronic control unit 8, automatically adjusts the deceleration to "rough", and an input device 15, in which the vehicle data is stored. A temperature sensor 16 determines the temperature in the hydraulic fluid reservoir 3, which is used by the electronic control unit 8 to adjust the intake volume of the hydraulic motor 5 as a function of said temperature. By way of the rotational speed sensor 16 and a sensor 17, the electronic control unit 8 determines the feed flow of the hydraulic pump 2.

The electronic control unit 8 and the hydraulic motor control valve can also be arranged in the chassis.

Hence it is possible to adjust the hydraulic motor 5 such that the speed of the vehicle reaches the desired speed adjusted by the driver by way of an accelerator pedal. Likewise, the vehicle also decelerates in line with a "rough", "medium" or "soft" deceleration defined by the driver regardless of the reduction of the reducing gear 7.

FIG. 2:

The diagram shows how the speed control takes place. The driver's request and hence the target travel speed are determined from the accelerator pedal position or the position of the main control valve or with the help of a pressure sensor in the control pressure of the accelerator pedal and the rotational speed of the internal combustion engine. The ordinate reflects the difference between the actual and the target speeds. The abscissa reflects the intake volume of the hydraulic motor. In this characteristic diagram, various characteristic lines are shown as a function of the current acceleration, which is calculated from the measured hydraulic motor rotational speed and the output rotational speed at the present gear ratio of the reducing gear. The smallest value of the hydraulic motor intake volume, for example, 54.50 cm$^3$/U, corresponds to the theoretically required minimum intake volume for achieving the maximum driving speed, which is dependent on the vehicle's speed category, for example, 20.25 km/h or 34.00 km/h, at the maximum rotational speed of the internal combustion engine and a completely activated accelerator pedal. The maximum value of the hydraulic motor intake volume is either the maximum intake volume of the hydraulic motor that is used or a reduced value if the maximum permissible driving torque during trailing throttle mode for the transmission were to be exceeded. If the current vehicle acceleration is positive and very high, for example a=2, which corresponds to line 18 and occurs, for example, during acceleration on a downward slope, the hydraulic motor intake volume q_HM is already increased 4 km/h before the target speed so that an overspeed can be avoided. If the current vehicle acceleration is nearly zero, a=0, which corresponds to line 19 and occurs, for example in the lowlands, the hydraulic motor intake volume q_HM is not varied until the target speed has been reached. If the speed v_lst increases above the target speed v_Soll, the hydraulic motor intake volume q_HM initially is raised very little and, upon further increases in the actual speed v_lst, is raised exponentially. This prevents vibrations while driving in the lowlands. If the current vehicle acceleration is negative, for example a=−2, which is illustrated by line 20, the hydraulic motor intake volume q_HM remains constant up to the point where the speed is exceeded by 4 km/h, for example, and then increases up to the maximum value upon further increases in the actual speed v_lst. Intermediate values can be interpolated.

When a reducing gear with two gears is used and arranged downstream, the following possibility exists. For the first gear, a single characteristic diagram exists for all vehicle speed categories, for example, 20 km/h, 25 km/h, 34 km/h maximum speed, i.e., in the first gear the maximum operating speed is constant. For the second gear a characteristic diagram exists for each speed category. This characteristic diagram or function is stored in the electronic control unit.

Figure 2:
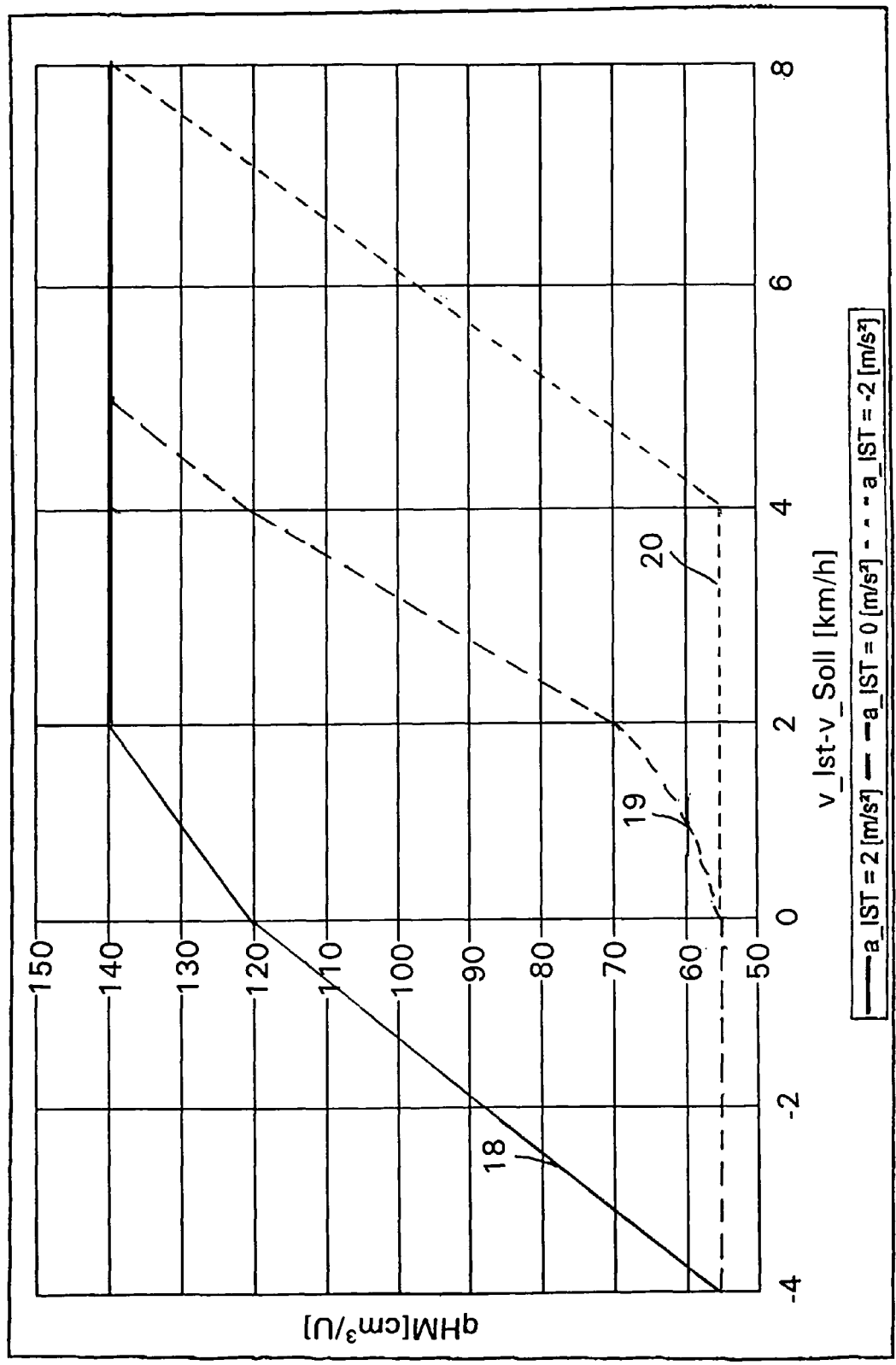
FIG. 2 shows a diagram of the hydraulic motor adjustment.

The smallest value for the hydraulic motor intake volume q_HM included in FIG. 2, which is so small that the maximum vehicle speed v_max can be reached at all times even with differing tolerance settings, is theoretically calculated (=f(Q_Fahren, n_soll)). Hence it is not necessary to calibrate the vehicle. Through an adaptive control system the actual minimum required hydraulic motor intake volume q_HM is determined. During stationary operating states, for example when the internal combustion engine is operated at its maximum rotational speed, the accelerator pedal is fully activated and/or the current acceleration is nearly zero and the actual speed is greater than the target speed, the smallest hydraulic motor intake volume q_HM value is increased in the characteristic diagram until the standard deviation is nearly zero. This adaptive control compensates existing tolerances, such as the setting of the pump, the setting of the quantity control of the main slide, the characteristic value of the control pressure piston stroke of the main slide, the characteristic value of the accelerator pedal position control pressure, the characteristic value of the control current control pressure of the HDD control, and the characteristic value of the control pressure q_HM in the hydraulic motor. The value of the intake volume of the hydraulic motor q_HM, which the adaptive control system determines, is stored in a stationary storage area of the electronic control unit.

REFERENCE NUMERALS 1 engine
2 hydraulic pump
3 hydraulic pressure reservoir
4 main control valve
5 hydraulic motor
6 working line
7 reducing gear
8 electronic control unit
9 sensor
10 accelerator pedal
11 rotational speed sensor
12 deceleration selector
13 creep speed switch
14 brake switch
15 input device
16 rotational speed sensor
17 sensor
18 line
19 line
20 line

The invention claimed is:

1. A hydrostatic transmission for a vehicle comprising:
   at least one hydraulic pump (2) and at least one hydraulic motor (5) having an adjustable intake volume;
   a reducing gear (7) having a selectable gear ratio arranged downstream of the hydraulic motor (5),
   two working lines (6) being connected to the hydraulic motor (5);
   the hydraulic pump (2) being connected to the hydraulic motor (5) by at least one of the two working lines (6) for removing hydraulic fluid from a hydraulic fluid reservoir (3) and supplying the hydraulic fluid to the hydraulic motor (5);
   a main control valve (4) located between the hydraulic pump (2) and the hydraulic motor (5);
   a brake valve for controllably restricting a flow of the hydraulic fluid leaving the hydraulic motor (5);
   a sensor (11) determining at least one of a vehicle speed and an output rotational speed corresponding to the vehicle speed;
   an electronic control unit (8) responsive to at least one of the vehicle speed and the output rotational speed for:
      determining a desired vehicle speed from at least one of a hydraulic motor output rotational speed for an engaged gear ratio, an accelerator pedal signal and a main control valve signal,
      measuring an actual vehicle speed from at least one of a measured transmission output rotational speed and a measured hydraulic motor output rotational speed for the engaged gear ratio,
      determining a deviation between an actual vehicle deceleration level determined from a change in one of the hydraulic motor output rotational speed at the engaged gear ratio and the actual vehicle speed and a previously defined deceleration level, and
   adjusting the intake volume of the hydraulic motor (5) such that:
      one of the actual vehicle speed and actual output rotational speed, determined by the sensor (11), substantially corresponds to one of the desired vehicle speed and the desired output rotational speed, and
      the previously defined deceleration level is maintained, during a braking operation, regardless of the engaged gear ratio of the reducing gear (7).

2. The hydrostatic transmission according to claim 1, wherein the previously defined deceleration level is varied.

3. The hydrostatic transmission according to claim 1, wherein the previously defined deceleration level is controlled and based upon a previously defined characteristic diagram.

4. The hydrostatic transmission according to claim 1, wherein upon actuation of a service brake (14) of the vehicle, the intake volume of the hydraulic motor (5) is automatically adjusted such that a maximum previously defined deceleration level is achieved.

5. The hydrostatic transmission according to claim 1, wherein a control signal, by which the hydraulic motor (5) is adjusted, is accordingly adapted when a current speed approaches a target speed.

6. The hydrostatic transmission according to claim 1, wherein the electronic control unit (8) maintains the hydraulic motor (5) at a maximum intake volume by a manually actuated signal (13).

7. The hydrostatic transmission according to claim 1, wherein a sensor (16) determines a temperature of the hydraulic fluid and supplies the determined temperature of the hydraulic fluid to the electronic control unit (8), and the electronic control unit (8) adjusts the hydraulic motor (5) such that a predefined temperature of the hydraulic fluid is not exceeded.

8. The hydrostatic transmission according to claim 1, wherein the electronic control unit calculates a minimum required intake volume of hydraulic fluid for the hydraulic motor (5), and an actual minimum intake volume is compared to the calculated minimum intake volume and an adaptive control system subsequently determines the actually required intake volume of the hydraulic motor and varies stored values until a standard deviation becomes nearly zero.

* * * * *